Patented May 7, 1935

2,000,018

UNITED STATES PATENT OFFICE 2,000,018

METHOD FOR THE SEPARATION OF EMULSIONS BY ELECTRICAL ACTION

Richard Heinrich, Berlin-Sudende, Germany, assignor to Siemens-Schuckertwerke Aktiengesellschaft, Berlin-Siemensstadt, Germany, a corporation of Germany No Drawing. Application November 30, 1931, Serial No. 578,215. In Germany December 5, 1930

3 Claims. (Cl. 204—24)

My invention relates to an improved method for the separation of emulsions by electrical action.

For the separation of emulsions of various kinds, in recent years an electrical treatment is often applied which consists in passing the emulsion between electrodes to which as a rule a high-tension alternating current or direct current is supplied. This treatment is mostly employed to separate water from oil. In cases, however, where alternating current or pulsating direct current of normal frequency is applied to the electrodes, the difficulty arises that conducting bridges are formed in the emulsion by the water droplets suspended in the oil which frequently lead to short circuits across the electrodes. Even if in the current supplied to the electrodes every second or third half wave is omitted, no appreciable improvement in the separating effect can be obtained. Generally speaking, in most cases it is not possible by this means to maintain at least to some extent a field of sufficient strength for the separating process. The object of my invention is to provide a method, as described in the following through which the above drawbacks are obviated and by which it is possible to separate the emulsion by electric treatment, even in particularly difficult cases.

For this purpose according to my invention, uni-directional voltage impulses having a duration of only about $10^{-5}$ seconds, or less, are impressed upon the electrodes of the apparatus, at time intervals between consecutive voltage impulses of at least ten times the duration of an impulse. As I have ascertained by experiments, it is possible when using such impulse voltages of short duration followed by intervals very long compared with the duration of the impulse voltages, to increase the field strength between the electrodes 50 to 100 per cent, without flash-overs or short circuits occurring between the electrodes. The reason for this lies evidently in the fact that with an impulse of such short duration and the following considerably longer pause the delay in the discharge of the electric field is so great that, in spite of the high intensity of the field, a complete breakdown between the electrodes cannot develop.

This method can be carried out with pulsating direct-current impulses, such as are described and shown in my copending joint application Heinrich and Feldmann, Serial No. 527,690, as well as with impulses produced from a direct current source. Impulse voltages have already been employed for the separation of emulsions, but in such prior art methods the duration of the current impulses was chosen much too long (about one fiftieth to one hundredth of a second) to bring about the said discharge-delaying effect. In this manner during the time intervals between impulses the supply of electric energy to the electrodes is substantially interrupted, and the emulsion is subjected to a comparatively long period of rest, which has electrostatically the result aforedescribed. Accordingly the separating effect by my novel method exceeds, so far as I am aware, by far all other prior art methods which enlist the aid of high voltage impulses.

When using such direct-current impulses it is of advantage to make the front slope of the voltage waves as steep as possible; it is so formed as to have a duration of only $10^{-6}$ seconds or less. By this means the field strength between the electrodes can be still more increased.

I claim as my invention:

1. A method of separating emulsions, for example of oil and water, by means of uni-directional current, consisting in supplying the electrodes of the separating apparatus with distinctly separate high voltage impulse discharges of a duration of not more than about $10^{-5}$ seconds at time intervals of at least ten times the duration of a voltage impulse, during which time intervals the supply of electric energy to the electrodes is substantially interrupted.

2. A method of separating emulsions, for example of oil and water, by means of direct current, consisting in supplying the electrodes of the separating apparatus with distinctly separate uni-directional high voltage impulse discharges of a duration of not more than about $10^{-5}$ seconds at time intervals of at least ten times the duration of a voltage impulse, during which time intervals the supply of electric energy to the electrodes is substantially interrupted.

3. A method of separating emulsions, for example of oil and water, by means of uni-directional current, consisting in supplying the electrodes of the separating apparatus with distinctly separate high voltage impulse discharges of a duration of not more than about $10^{-5}$ seconds at time intervals of at least ten times the duration of a voltage impulse, during which time intervals the supply of electric energy to the electrodes is substantially interrupted, the front slope of the voltage impulse curves being formed so steep that it has a duration of not more than $10^{-6}$ seconds.

RICHARD HEINRICH.